United States Patent
Dai

(10) Patent No.: US 8,989,912 B2
(45) Date of Patent: Mar. 24, 2015

(54) APPARATUS AND METHOD FOR COLLECTING AND CONTROLLING TEMPERATURE

(75) Inventor: Hang Dai, Shenzhen (CN)

(73) Assignee: ZTE Corporation, Shenzhen (CN)

(*) Notice: Subject to any disclaimer, the term of this patent is extended or adjusted under 35 U.S.C. 154(b) by 621 days.

(21) Appl. No.: 13/257,941

(22) PCT Filed: Sep. 4, 2009

(86) PCT No.: PCT/CN2009/073759
§ 371 (c)(1),
(2), (4) Date: Dec. 16, 2011

(87) PCT Pub. No.: WO2010/148588
PCT Pub. Date: Dec. 29, 2010

(65) Prior Publication Data
US 2012/0083941 A1    Apr. 5, 2012

(30) Foreign Application Priority Data
Jun. 23, 2009 (CN) .......................... 2009 1 0150250

(51) Int. Cl.
*G01K 1/02* (2006.01)
*G05D 23/19* (2006.01)
(52) U.S. Cl.
CPC .............. *G01K 1/02* (2013.01); *G05D 23/1931* (2013.01)
USPC ....................................................... 700/299
(58) Field of Classification Search
None
See application file for complete search history.

(56) References Cited

U.S. PATENT DOCUMENTS 5,743,464 A    4/1998    Koyama
(Continued)

FOREIGN PATENT DOCUMENTS

CN    1869853 A    11/2006
(Continued)

OTHER PUBLICATIONS

International Search Report in international application number: PCT/CN2009/073759, mailed on Mar. 11, 2010.
(Continued)

*Primary Examiner* — Darrin Dunn
*Assistant Examiner* — Christopher E Everett
(74) *Attorney, Agent, or Firm* — Oppedahl Patent Law Firm LLC

(57) ABSTRACT

An apparatus for collecting and controlling a temperature is closed, it comprises a temperature collecting unit (1), a temperature collecting path (2) and a temperature controlling unit (3). The temperature collecting path (2) comprises a fast sensing path (20) and a slow sensing path (22). The fast sensing path (20) is connected to temperature sensing spots of a device and is used for obtaining temperatures of the temperature sensing spots of the device in a first predefined period. The slow sensing path (22) is connected to functional units (5) of the device and is used for obtaining temperatures of the functional units in a second predefined period. The second predefined period is greater than the first predefined period. The temperature collecting unit (1) is used for collecting the temperatures of the temperature sensing spots and the temperatures of the functional units obtained by the temperature collecting path (2); and the temperature controlling unit (3) is used for controlling a temperature of the device according to a difference value between the temperature of the functional unit and the temperature of the temperature sensing spot at the same time. And a method for collecting and controlling a temperature is provided.

7 Claims, 6 Drawing Sheets

(56) References Cited

U.S. PATENT DOCUMENTS

| | | | |
|---|---|---|---|
| 7,480,588 B1 * | 1/2009 | Walker | 702/132 |
| 7,490,479 B2 | 2/2009 | Byquist et al. | |
| 2004/0217881 A1 * | 11/2004 | Pedyash et al. | 340/870.07 |
| 2006/0222045 A1 | 10/2006 | Byquist et al. | |
| 2007/0213882 A1 * | 9/2007 | Inukai et al. | 700/300 |
| 2008/0188994 A1 * | 8/2008 | Singh et al. | 700/300 |
| 2009/0228148 A1 | 9/2009 | Byquist et al. | |
| 2010/0278086 A1 * | 11/2010 | Pochiraju et al. | 370/310 |
| 2012/0243574 A1 * | 9/2012 | Walker | 374/176 |

FOREIGN PATENT DOCUMENTS

| | | |
|---|---|---|
| CN | 101334677 A | 12/2008 |
| JP | 61195723 U | 12/1986 |
| JP | H0527807 A | 2/1993 |
| JP | 200122451 A | 1/2006 |
| JP | 2010054472 A | 3/2010 |
| JP | 2010076536 A | 4/2010 |
| JP | 2010092707 A | 4/2010 |

OTHER PUBLICATIONS

English Translation of the Written Opinion of the International Search Authority in international application No. PCT/CN2009/073759, mailed on Mar. 11, 2010.

* cited by examiner

APPARATUS AND METHOD FOR COLLECTING AND CONTROLLING TEMPERATURE

TECHNICAL FIELD

The present invention relates to the technical field of communications, particularly to an apparatus and a method for collecting and controlling a temperature in the field of communications.

BACKGROUND

A temperature is a control parameter often involved in everyday life and industrial production, which has obvious characteristics of great inertia, variable parameter and non-linearity, so that it is very difficult to establish an accurate mathematical model for the temperature. For various devices in the field of production, temperature collection and control are very important functions.

At present, it has been able to collect a temperature automatically and feed back the collection result to a temperature control device, to realize the function of automatic temperature control. However, temperature collection in the prior art is chiefly based on fast temperature collection at a higher frequency. FIG. 1 shows a structure diagram of an apparatus for collecting and controlling a temperature in the related art, and as shown in FIG. 1, the apparatus for collecting and controlling a temperature mainly comprises a temperature controlling unit, a temperature collecting unit and a temperature collecting path. A device requiring of which a temperature is required to be collected mainly comprises one or more functional units (3 functional units are shown in FIG. 1). Further, the temperature collecting unit collects temperature values of the functional units at a higher frequency through the temperature collecting path and sends the temperature values to the temperature controlling unit in real time; and the temperature controlling unit controls the temperature of the device based on the collected temperature values according to actual demands. The above method needs to be carried out in real time, namely, the temperature value of each functional unit of the device should be collected at higher frequency, so that the temperature variation of the device can be reflected in time, and then the temperature values are sent to the temperature controlling unit in real time.

Therefore, under the circumstance of more functional units of the device, the number of temperature values to be collected is greatly increased, and more system resources (such as intercommunication resources and processing resources of the device) may be occupied, so that it is impossible to reconcile both responding timeliness and resource occupation of the automatic temperature control.

SUMMARY

The present invention is provided aiming at solving the problem that, it is impossible to reconcile both responding timeliness and resource occupation of the automatic temperature control as the number of the temperature values to be collected is greatly increased; therefore, the main purpose of the present invention is to provide an improved temperature collection and control scheme so as to solve at least one of the problems described above.

According to one aspect of the present invention, an apparatus for collecting and controlling a temperature is provided.

The apparatus for collecting and controlling a temperature according to the present invention comprises: a temperature collecting unit, a temperature collecting path and a temperature controlling unit; wherein the temperature collecting path comprises a fast sensing path and a slow sensing path: the fast sensing path is connected with temperature sensing spots of a device controlled by the apparatus and is used for obtaining temperatures of the temperature sensing spots of the device in a first predefined period; the slow sensing path is connected with functional units of the device and is used for obtaining temperatures of the functional units in a second predefined period, wherein the second predefined period is greater than the first predefined period; the temperature collecting unit is used for collecting the temperatures of the temperature sensing spots and the temperatures of the functional units; and the temperature controlling unit is used for controlling a temperature of the device according to a difference value between the temperature of the functional unit and the temperature of the temperature sensing spot at the same time.

According to another aspect of the present invention, a method for collecting and controlling a temperature is provided.

The method for collecting and controlling a temperature according to the present invention comprises: arranging temperature sensing spots on a device, and obtaining temperatures of the temperature sensing spots in a first predefined period, wherein the temperatures of the temperature sensing spots are used for reflecting an average temperature of the device; obtaining temperatures of functional units of the device in a second predefined period, wherein the second predefined period is greater than the first predefined period; calculating a difference value between the obtained temperature of the functional unit and the temperature of the temperature sensing spot obtained at the same time; and controlling a temperature of the device according to the difference value in a time period equal to the second predefined period.

The scheme of temperature collection and control provided by the present invention is that arranging temperature sensing spots on a device, collecting temperatures of the temperature sensing spots at a higher frequency and obtaining temperatures of functional units of the device at a lower frequency, and calculating a difference value between the obtained temperature of the functional unit and the temperature of the temperature sensing spot obtained at the same time and controlling a temperature of the device according to the difference value. Therefore, the problems that as the number of the temperature values to be collected is greatly increased, it is impossible to reconcile both responding timeliness and resource occupation of the automatic temperature control is solved, so that the occupation of the system resource can be reduced under the premise of collecting the temperature of the device in time.

Other characteristics and advantages of the present invention will be elaborated in the following description, and part of them become obvious from the description or can be understood through implementation of the present invention. The purposes and other advantages of the present invention can be realized and achieved through structures specified in the description, claims and figures.

BRIEF DESCRIPTION OF THE DRAWINGS

The figures help with further understanding of the present invention, which may be part of the description, are used for explaining the present invention with the embodiments of the present invention and do not limit the present invention. In the figures.

DETAILED DESCRIPTION

Function Summary

In consideration of the problem in the related art that it is impossible to reconcile both responding timeliness and resource occupation of the automatic temperature control as the number of the temperature values to be collected is greatly increased, an embodiment of the present invention provides an improved scheme of temperature collection and control in which temperature collection is classified into different types according to sources, wherein for one type, that is for a common functional unit, the temperature is sensed according to a temperature sensing circuit in the unit and is collected by a collecting unit, by adopting a slow sensing method in an embodiment of the present invention; and for the other type, a small quantity of temperature sensing spots are arranged according to the heat source distribution of the device, and the temperatures of the temperature sensing spots are obtained by adopting a fast sensing method. In normal operation, a temperature collecting unit obtains the temperature of the device mainly depending on the fast sensing method, and collects the temperatures of the functional units through the slow sensing path periodically in order to correct the deviation of fast sensing. Therefore, not only is the temperature value of the device can be obtained more accurately, but also the problem of resource occupation caused by large quantity of functional units can be avoided.

Under the circumstance of no conflict, embodiments and features in embodiments of the present application can be combined with each other.

The preferred embodiments of the present invention will be explained below in combination with the accompanying figures. It should be appreciated that the preferred embodiments described here are only used for illuminating and explaining the present invention instead of limiting the present invention.

Apparatus Embodiment

According to an embodiment of the present invention, an apparatus for collecting and controlling a temperature is provided in the first place.

Figure 1:
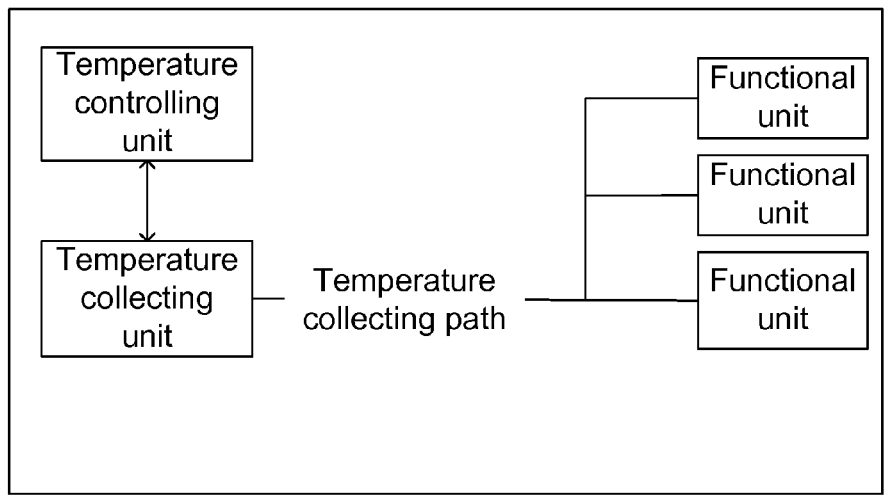
FIG. 1 is a structure diagram of an apparatus for collecting and controlling a temperature in the related art.
Figure 2:
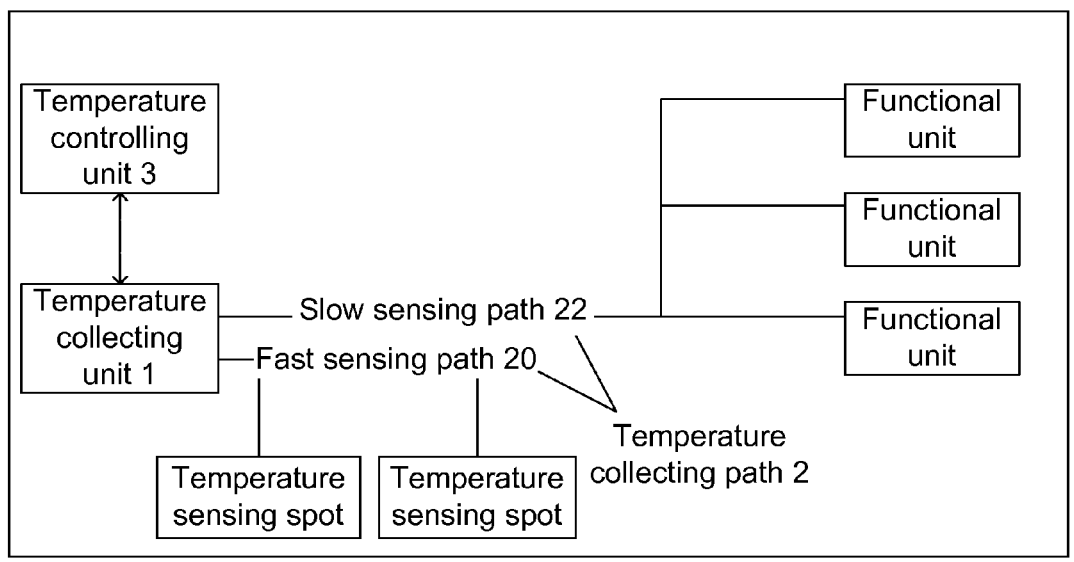
FIG. 2 is a structure diagram of an apparatus for collecting and controlling a temperature according to an embodiment of the present invention.
Figure 3:
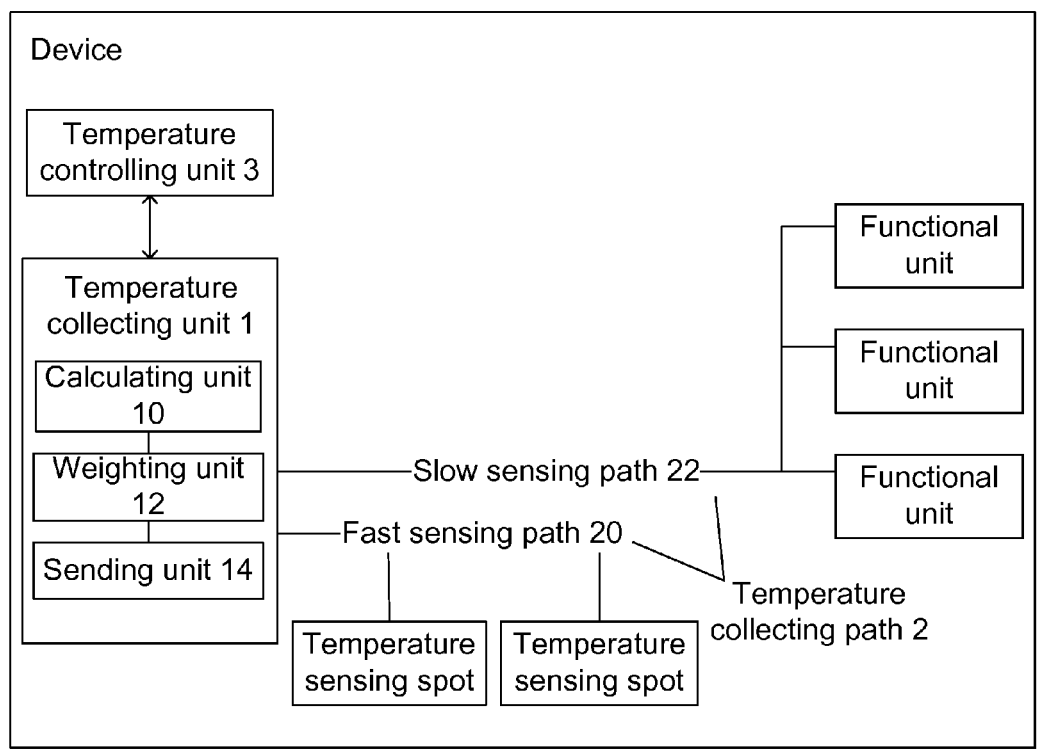
FIG. 3 is a structure diagram of an apparatus for collecting and controlling a temperature according to a preferred embodiment of the present invention.

FIG. 2 is a structure diagram of an apparatus for collecting and controlling a temperature according to an embodiment of the present invention. FIG. 3 is a structure diagram of an apparatus for collecting and controlling a temperature according to a preferred embodiment of the present invention. As shown in FIG. 2, an apparatus for collecting and controlling a temperature comprises a temperature collecting unit 1, a temperature collecting path 2 and a temperature controlling unit 3; the temperature collecting path 2 comprises a fast sensing path 20 and a slow sensing path 22; wherein the fast sensing path 20 is connected with temperature sensing spots of a device controlled by the apparatus and is used for obtaining temperatures of the temperature sensing spots of the device in a first predefined period; the slow sensing path 22 is connected with functional units (three functional units are shown in the figure) of the device and is used for obtaining temperatures of the functional units in a second predefined period, and the second predefined period is greater than the first predefined period; the temperature collecting unit 1 is used for collecting the temperatures of the temperature sensing spots and the temperatures of the functional units which are obtained by the temperature collecting path; and the temperature controlling unit 3 is used for controlling a temperature of the device according to a difference value between the temperature of the functional unit and the temperature of the temperature sensing spot at the same time. Further description is provided below in combination with FIG. 3.

Preferably, as shown in FIG. 3, according to a preferred embodiment of the present invention, the temperature collecting unit 1 comprises a calculating unit 10, a weighting unit 12 and a sending unit 14; wherein the calculating unit 10 is used for calculating the difference value between the temperature of the functional unit and the temperature of the temperature sensing spot at the same time; the weighting unit 12, which is connected with the calculating unit 10, is used for obtaining a weighted value by addition of the difference value and a temperature of the temperature sensing spot after the time; and the sending unit 14, which is connected with the weighting unit 12, is used for sending the weighted value to the temperature controlling unit so as to control the temperature of the device.

Preferably, the temperature sensing spots (two temperature sensing spots are shown in FIG. 2 and FIG. 3 respectively) may be multiple, wherein the temperature of each temperature sensing spot can be sensed and obtained by the temperature collecting unit through a fast polling mode and be used for reflecting an average temperature of each partition.

Preferably, the temperature sensing spots are arranged according to a heat source temperature distribution of the device.

Through the above-mentioned embodiment, an apparatus for collecting and controlling a temperature is provided which combined the temperature collecting unit 1, the temperature collecting path 2 and the temperature controlling unit 3, and by using this apparatus, the temperature value of a device provided with large quantity of functional units inside can be obtained more accurately, and the occupation of system resource can be reduced.

Method Embodiment

According to an embodiment of the present invention, a method for collecting and controlling a temperature is also provided.

Figure 4:
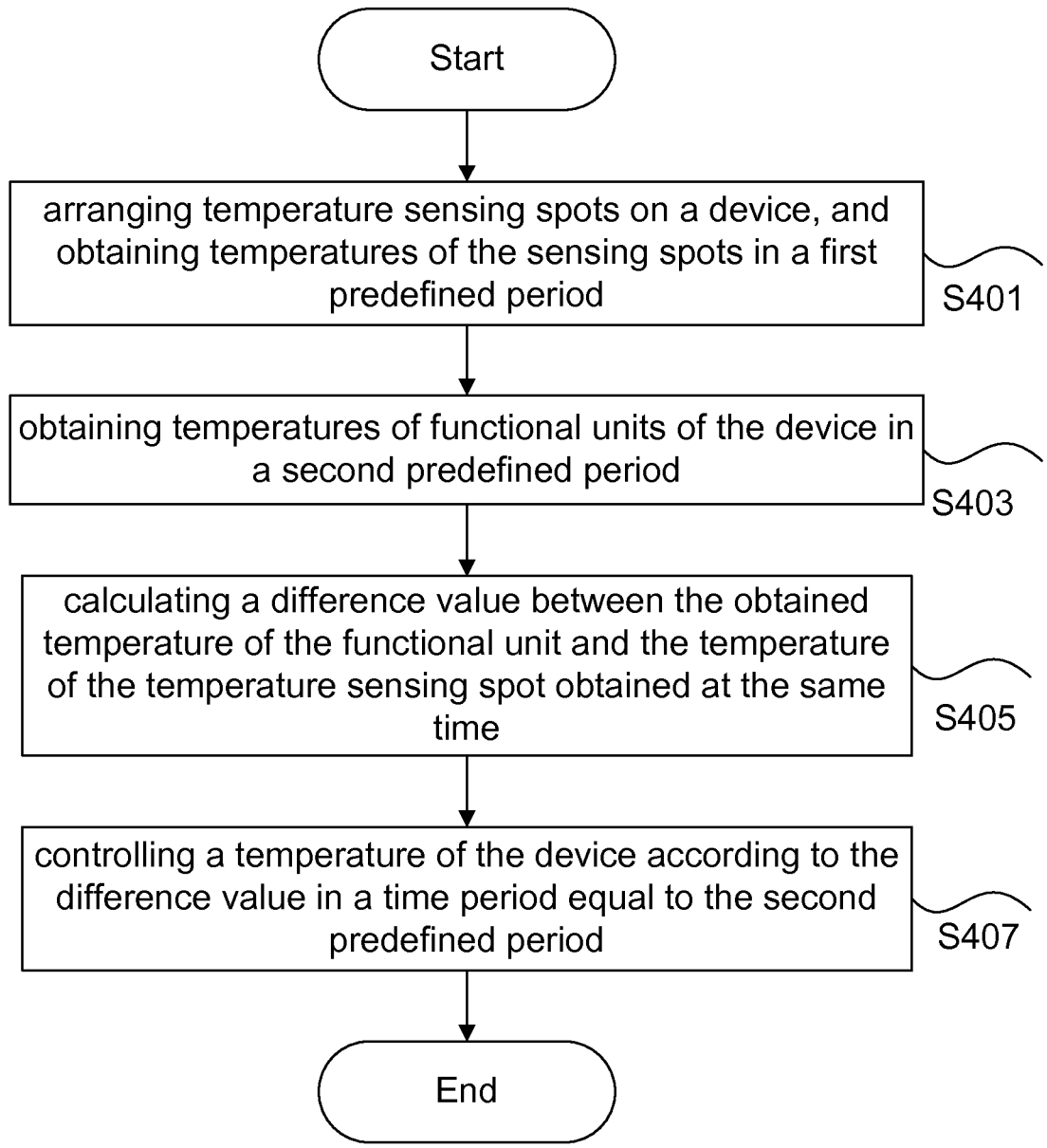
FIG. 4 is a flow diagram of a method for collecting and controlling a temperature according to an embodiment of the present invention.

FIG. 4 is a flow diagram of a method for collecting and controlling a temperature according to an embodiment of the present invention. As shown in FIG. 4, according to an embodiment of the present invention, a method for collecting and controlling a temperature comprises the following processing steps (step S401 to step S407).

Step S401: arranging temperature sensing spots on a device, and obtaining temperatures of the temperature sensing spots in a first predefined period; wherein the temperatures of the temperature sensing spots are used for reflecting an average temperature of the device.

Preferably, the first predefined period is generally set to be smaller, namely, the temperatures of the temperature sensing spots are obtained fast at a higher frequency.

Preferably, the temperature sensing spots can be arranged according to a heat source temperature distribution of the device.

Preferably, the temperature sensing spots may be multiple, wherein the temperature of each temperature sensing spot can be sensed and obtained through a fast polling mode and used for reflecting an average temperature of each partition, that is, the step of obtaining the temperatures of the temperature sensing spots comprises: sensing and obtaining the temperature of each temperature sensing spot through a fast polling mode.

Step S403: obtaining temperatures of functional units of the device in a second predefined period; wherein the second predefined period is greater than the first predefined period.

Wherein the performing of step S401 and step S403 is not necessarily in order, and the temperature collecting unit can collect the temperatures of the temperature sensing spots while collecting the temperatures of the functional units of the device.

Preferably, the step of obtaining the temperatures of the functional units can be performed in the following way: sensing and obtaining the temperatures of the functional units according to temperature sensing circuits of the functional units.

Preferably, the second predefined period is generally set to be larger, namely, the temperatures of the temperature sensing spots are obtained slowly at a lower frequency, so that the temperatures of the functional units are not collected at all moments that the temperatures of the temperature sensing spots are collected; in a specific implementation process, the temperatures of the temperature sensing spots can be collected for several times in a time interval between two temperature collections of the functional units.

Step S405: calculating a difference value between the obtained temperature of the functional unit and the temperature of the temperature sensing spot obtained at the same time.

Step S407: controlling a temperature of the device according to the difference value in a time period equal to the second predefined period.

Preferably, the step of controlling the temperature of the device according to the difference value comprises the processing below:

(1) obtaining a weighted value by addition of the difference value and a temperature of the temperature sensing spot after the time that the temperature of the functional unit is obtained; and (2) controlling the temperature of the device through the weighted value.

The process of controlling the temperature of the device according to the difference value between the obtained temperature of the functional unit and the temperature of the temperature sensing spot obtained at the same time in a time period equal to the second predefined period is described in step S401 to step S407, and the process of the next period is implemented in the same way. In the next period, if the difference value between the obtained temperature of the functional unit and the temperature of the temperature sensing spot obtained at the same time is different from the difference value of this time, the difference value of this time needs to be replaced to revise temperatures of the sensing spots collected in the next period for controlling the temperature of the device.

Figure 5:
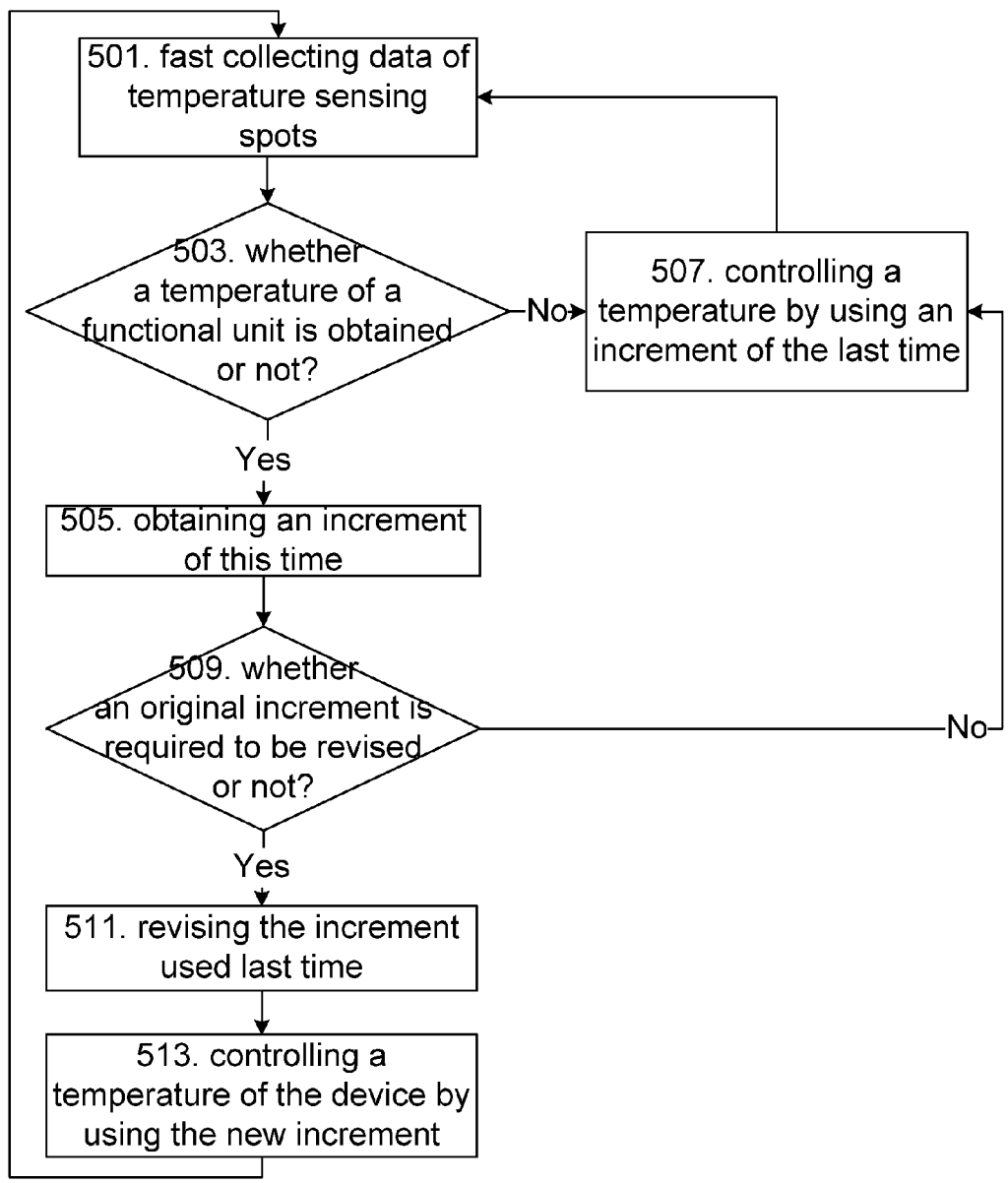
FIG. 5 is a flow diagram of a method for collecting and controlling a temperature according to a preferred embodiment of the present invention.

FIG. 5 is a flow diagram of a method for collecting and controlling a temperature according to a preferred embodiment of the present invention; as shown in FIG. 5, according to a preferred embodiment of the present invention, a method for collecting and controlling a temperature comprises the following processing (from step S501 to step S513).

Step S501: fast collecting temperatures of temperature sensing spots through the fast sensing path at a higher frequency (in a smaller period).

Step S503: determining whether a current temperature of the functional unit is collected through the slow sensing path, if yes, executing step S505, otherwise executing step S507.

Wherein since the frequency of obtaining the temperatures of the functional units through the slow sensing path is lower than the frequency of obtaining the temperatures of temperature sensing spots through the fast sensing path, for a certain moment, it needs to be determined whether the current temperature of the functional unit is collected through the slow sensing path or not.

Step S505: obtaining the current temperature of the functional unit of the device, and comparing the temperature value with the current temperature of the temperature sensing spot to obtain a difference of the two values (namely, an increment of this time).

Step S507: controlling the temperature of the device by using an increment of the last time.

Step S509: determining whether the increment used last time is required to be revised (replaced) or not, if yes, executing step S511, otherwise executing step S507.

Step S511: replacing (revising) the increment of the last time with the increment of this time.

Step S513: controlling the temperature of the device by using the new increment.

Through the embodiment, a method for collecting and controlling a temperature is provided, in which the temperature of a device is obtained by the fast sensing method, and the temperature of each functional unit is collected through slow sensing periodically, so as to correct the deviation of fast sensing. Therefore, not only can the temperature value of the device be obtained more accurately, but also the problem of resource occupation caused by large quantity of functional units can be avoided.

EXAMPLES

Figure 6:
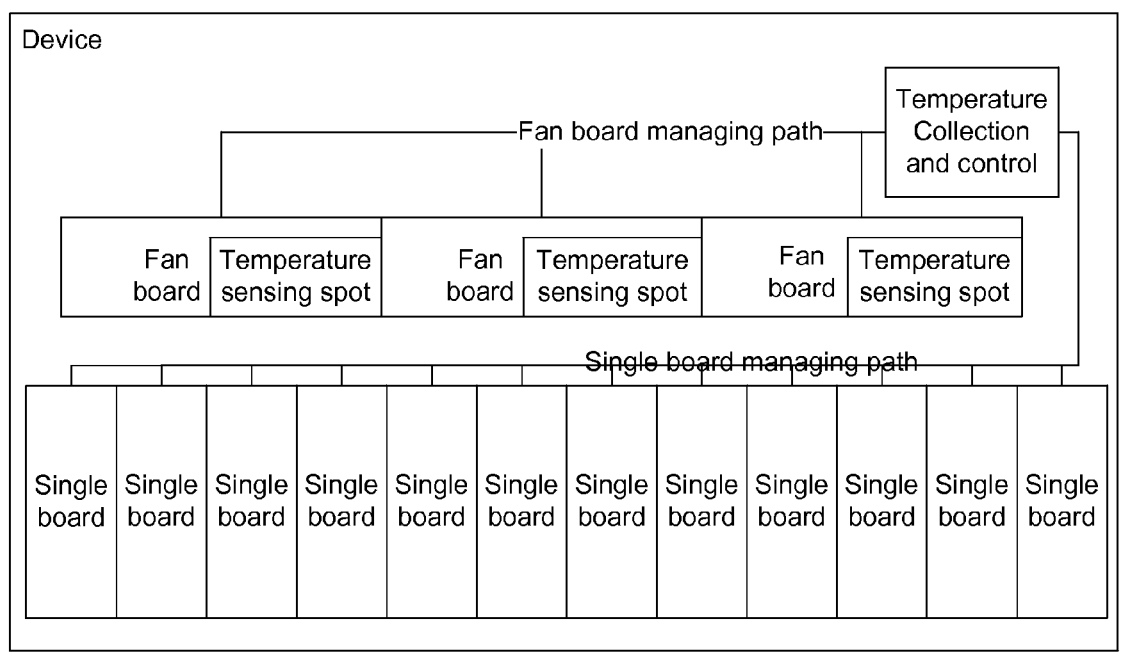
FIG. 6 is a detailed structure diagram of an apparatus for collecting and controlling a temperature according to an embodiment of the present invention.

FIG. 6 is a detailed structure diagram of an apparatus for collecting and controlling a temperature according to an embodiment of the present invention. As shown in FIG. 6, according to a preferred embodiment of the present invention, an apparatus for collecting and controlling a temperature comprises: a temperature collecting unit (equivalent to the temperature collecting unit in FIG. 2), a fan board managing path (equivalent to the controlling interface and the fast sensing path in FIG. 2), a single board managing path (equivalent to the slow sensing path in FIG. 2), three fan boards (equivalent to the temperature controlling unit in FIG. 2) and twelve single boards (equivalent to the functional units in FIG. 2), wherein the temperature collecting unit obtains the temperatures of temperature sensing spots of a device at a higher frequency through the fan board managing path.

Each single board inside the device can sense the temperature value of itself; and reflect different temperature characteristics since the single boards have different designs and temperatures. The temperature collecting unit obtains the current temperatures measured by temperature sensing circuits of the single boards themselves at a lower frequency through the single board managing path. At the moment, the current temperature of the single board is compared with the current temperature of the temperature sensing spot to obtain a difference value so as to control the temperature of the device.

Preferably, the apparatus comprises three temperature sensing spots, further, in order to better control the temperatures of all parts of the device, the device can be partitioned, and a temperature sensing spot is arranged in each partition which reflects an average temperature of the partition.

Preferably, the temperature collecting unit senses and obtains the temperature of the sensing spot of each partition through a fast polling mode.

Figure 7:
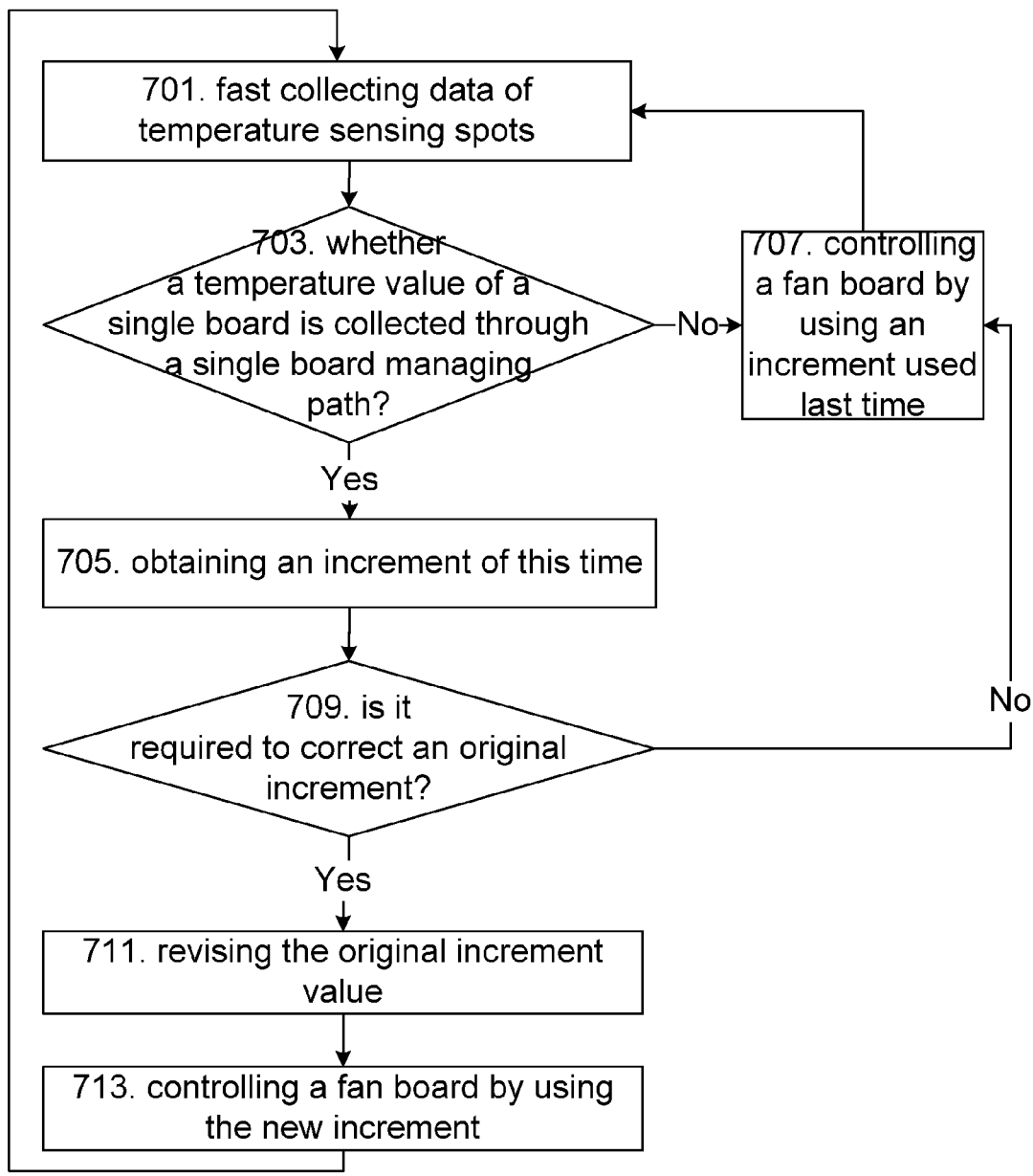
FIG. 7 is a detailed flow diagram of a method for collecting and controlling a temperature according to an embodiment of the present invention.

FIG. 7 is a detailed flow diagram of a method for collecting and controlling a temperature according to an embodiment of the present invention. As shown in FIG. 7, according to an embodiment of the present invention, a method for collecting and controlling a temperature comprises the following processing (from step S701 to step S713).

Step S701: obtaining temperatures of temperature sensing spots of a device at a higher frequency through the fan board managing path by the temperature collecting unit.

Step S703: determining whether temperature values of the single boards are collected through the single board managing path, if yes, executing step S705, otherwise executing step S707.

Step S705: obtaining the current temperature of the single board, and comparing the temperature value with the current temperature of the temperature sensing spot to obtain a difference of the two values (namely, an increment of this time).

Step S707: controlling a rotational speed of the fan board by using an increment of the last time so as to control the temperature of the device.

Step S709: comparing the increment of this time with the increment used last time, determining whether the increment value used last time (originally) is required to be revised or not, if yes, executing step S711, otherwise executing step S707.

Step S711: revising the increment value used last time.

Step S713: controlling the rotational speed of the fan board by using the new increment (the increment of this time).

To conclude, through the improved scheme of temperature collection and control provided by the embodiment of the present invention, for a device provided with large quantity of functional units inside, sensing spots are arranged according to the heat source distribution of the device; the temperatures of functional units are collected through the slow sensing method, and the temperatures of the sensing spots are collected through the fast sensing method, so that the temperature value of the device can be obtained more promptly and more accurately, and the problem of resource occupation caused by large quantity of the functional units can be avoided. Therefore, the problem that it is impossible to reconcile both responding timeliness and resource occupation of the automatic temperature control as the number of the temperature values to be collected is greatly increased is effectively solved.

According to the embodiment of the present invention, a computer readable medium is also provided; a computer executable command is stored on the computer readable medium; when the command is executed by a computer or processor, the computer or processor executes the processing of steps shown in FIG. 4, FIG. 5 and FIG. 7; and preferably, processing in one or more embodiments described above can be executed.

Besides, the present invention can be implemented easily with no modification to the system framework or the prior processing flow, therefore can be popularized in the technical field conveniently, and has stronger industrial applicability.

Obviously, technical personnel in the field should understand that the modules or steps of the present invention can be realized through a universal calculating device; the modules or steps can be centralized on a single calculating device or distributed on a network constituted by a plurality of calculating devices, and optionally, the modules or steps can be realized through program codes executable by a calculating device so as to be stored in a storage device and executed by the calculating device; or the modules or steps can be manufactured into a plurality of integrated circuit modules respectively, or a plurality of the modules or steps can be manufactured into single integrated circuit modules, so as to realize the modules or steps. Therefore, the present invention is not restricted to any specific combination of hardware and software.

The above is only preferred embodiments of the present invention, and is not to limit the present invention. For person skilled in the art, various modifications and changes can be made to the present invention without departing from the spirit and principle of the present invention, any modifications, equivalent substitutes, improvements and the like should be included within the protection scope of the present invention.

What is claimed is:

1. An apparatus for collecting and controlling a temperature, comprising a temperature collecting unit, a temperature collecting path and a temperature controlling unit,
    wherein the temperature collecting path comprises a fast sensing path and a slow sensing path:
    the fast sensing path is connected with temperature sensing spots of a device controlled by the apparatus and is used for continuously obtaining temperatures of the temperature sensing spots of the device in a plurality of first predefined periods;
    the slow sensing path is connected with functional units of the device and is used for continuously obtaining temperatures of the functional units in a plurality of second predefined periods, wherein each of the second predefined periods is greater than each of the first predefined periods;
    the temperature collecting unit is used for collecting the temperatures of the temperature sensing spots and the temperatures of the functional units; and
    the temperature controlling unit is used for controlling a temperature of the device according to a difference value, the difference value being the difference between the obtained temperature of the functional unit and the obtained temperature of the temperature sensing spot at the end of each of the second predefined periods;
    wherein the temperature collecting unit comprises:
    a calculating unit for calculating the difference value at the end of each of the second predefined periods;
    a weighting unit for calculating a weighted value, the weighted value being the difference value added to the obtained temperature of the temperature sensing spot after each of the first predefined periods; and
    a sending unit for sending the weighted value to the temperature controlling unit so as to control the temperature of the device through the weighted value.

2. The apparatus according to claim 1, wherein the temperature sensing spots are multiple, wherein the temperature of each temperature sensing spot is sensed and obtained by the temperature collecting unit through a fast polling mode and is used for reflecting an average temperature of each partition of the device.

3. The apparatus according to claim 1, wherein the temperature sensing spots are arranged according to a heat source temperature distribution of the device.

4. A method for collecting and controlling a temperature, comprising:

arranging temperature sensing spots on a device, and continuously obtaining temperatures of the temperature sensing spots in a plurality of first predefined periods;

continuously obtaining temperatures of functional units of the device in a plurality of second predefined periods, wherein each of the second predefined periods is greater than each of the first predefined periods;

calculating a difference value, the difference value being the difference between the obtained temperature of the functional unit and the obtained temperature of the temperature sensing spot at the end of each of the second predefined periods;

calculating a weighted value, the weighted value being the difference value added to the obtained temperature of the temperature sensing spot after each of the first predefined periods; and controlling the temperature of the device through the weighted value.

5. The method according to claim 4, wherein the temperature sensing spots are multiple, and the step of obtaining the temperatures of the temperature sensing spots comprises: sensing and obtaining the temperature of each temperature sensing spot through a fast polling mode are used for reflecting an average temperature of the device.

6. The method according to claim 4, wherein the step of arranging the temperature sensing spots comprises arranging the temperature sensing spots according to a heat source distribution of the device.

7. The method according to claim 4, wherein the step of obtaining the temperatures of the functional units comprises: sensing and obtaining the temperatures of the functional units according to temperature sensing circuits of the functional units.

* * * * *